July 5, 1966 — J. H. CASTOE — 3,259,366
CASTER AND CAMBER DETERMINING TOOL

Filed Dec. 14, 1964 — 2 Sheets-Sheet 1

JOHN H. CASTOE,
INVENTOR.

BY
Harold J. LoVisconte
ATTORNEY.

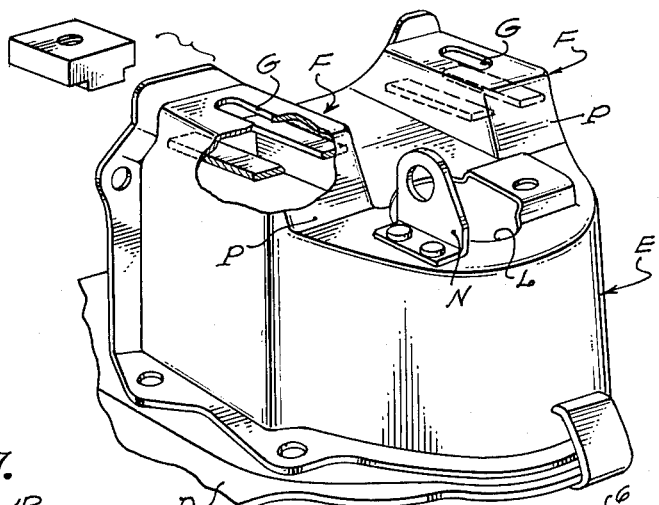
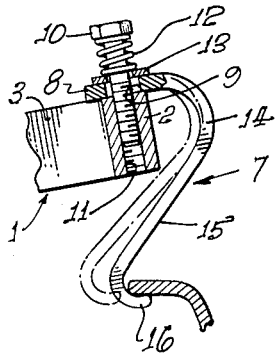
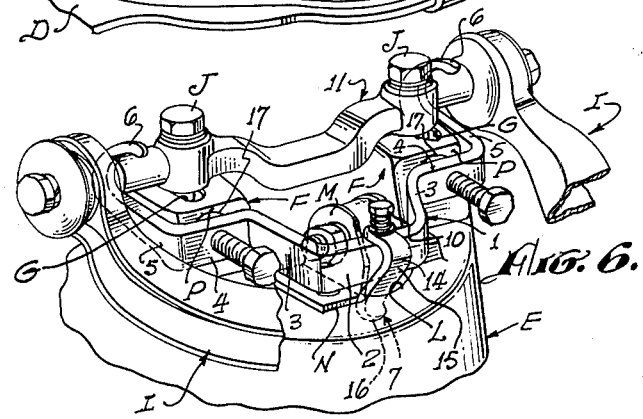
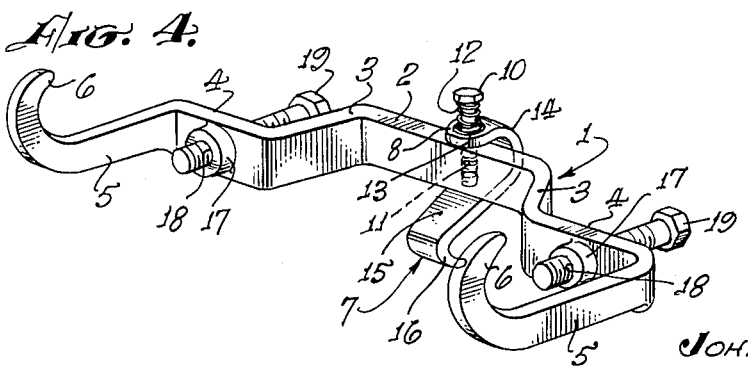
John H. Castoe,
INVENTOR.

United States Patent Office 3,259,366
Patented July 5, 1966

3,259,366
CASTER AND CAMBER DETERMINING TOOL
John H. Castoe, 6718 Shady Grove St., Tujunga, Calif.
Filed Dec. 14, 1964, Ser. No. 418,233
3 Claims. (Cl. 254—100)

This invention, like that of my co-pending application Serial No. 404,618, filed October 19, 1964, relates to means for effecting the caster and camber adjustment of the front wheels of certain models of automobiles having a specific form of independently sprung front wheels. In general, the independently sprung front wheel suspension of automobiles includes a member pivotally mounted on the frame of the automobile for swinging movement about a substantially horizontal axis extending substantially parallel to the longitudinal dimension of the vehicle and to the free end of which the upper end of the knuckle carrying the front wheel spindle is connected for oscillatory movement about a substantially vertical axial line incident to the steering of the vehicle. The adjustment with which this invention is concerned is that which affects the angular position of the axial line of the pivotal movement of the steering knuckle. This is seldom, if ever, disposed in an exactly vertical position. Depending on the vehicle, it may be inclined slightly so that the upper end of the steering knuckle is, in effect, sloping downwardly forwardly of a vertical plane extending transversely of the vehicle or rearwardly of such a plane resulting in what is known, respectively, as positive or negative caster adjustments.

Similarly it is desirable that the axis of movement of the steering knuckle with respect to a vertical plane extending parallel to the length of the vehicle be adjustable and when this slope is downwardly and inwardly toward the vehicle it is known as a positive camber adjustment and when it is inclined downwardly and outwardly laterally from the vehicle, it is known as a negative camber adjustment. The angles of such adjustments are very slight and seldom, if ever, exceed about one-half of a degree.

Figure 1:
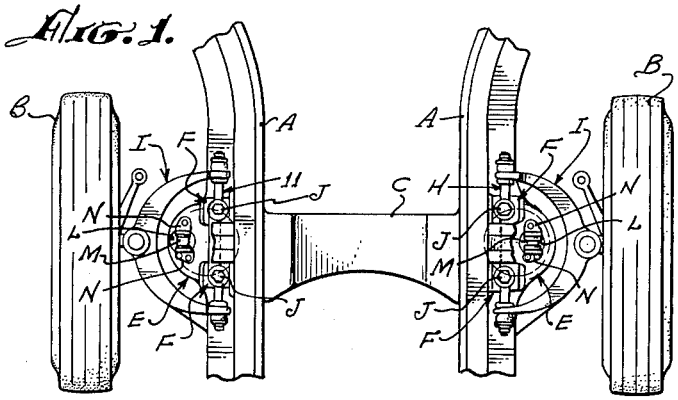
Figure 2:
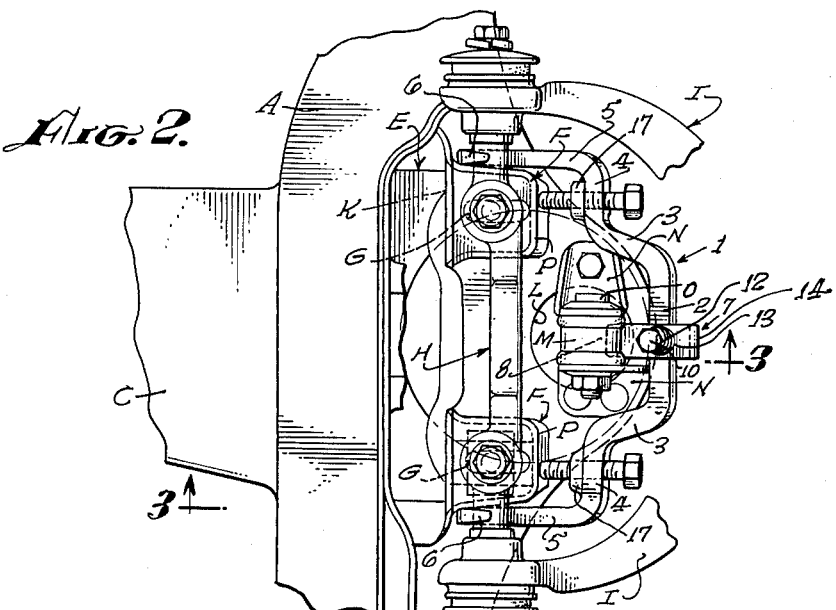
Figure 3:
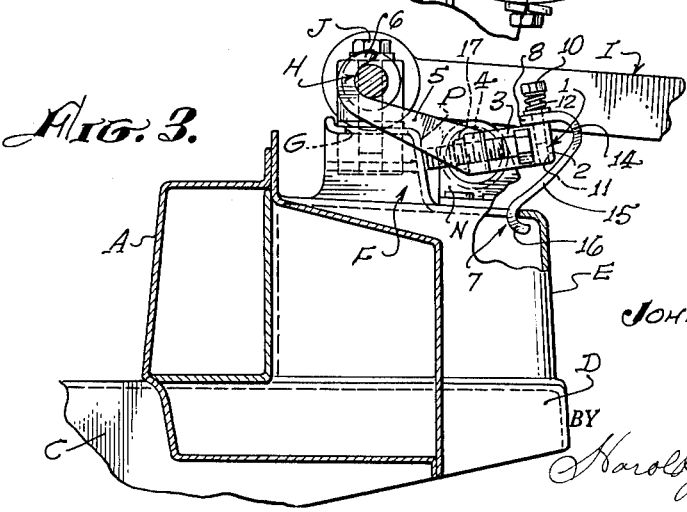

The present invention has for its principal object the provision of a simple, readily attachable and detachable jack screw means for achieving the desired camber and caster adjustments on a particular make and model of automotive vehicle other than that for which the means of my said prior application is especially intended, a presently preferred embodiment of the invention being described in the following specification and illustrated in the accompanying drawings which form a part of said specification and in which drawings:

FIG. 1 is a top plan view of a vehicle front wheel mounting of the type for which the present invention is intended, FIG. 2 is a greatly enlarged, fragmentary, top plan view of the front wheel mounting means at the right hand side of FIG. 1 with the adjusting device of the present invention applied thereto, FIG. 3 is a fragmentary transverse section taken on the line 3—3 of FIG. 2, FIG. 4 is a perspective view of the jack screw device of the present invention, FIG. 5 is a perspective view of the spring housing component of the front wheel suspension assembly with reference to which the device of the present invention effects the camber and caster adjustments, FIG. 6 is a perspective view of the device of the present invention disposed in the position of use, and FIG. 7 is a transverse sectional view on the line 7—7 of FIG. 4.

Referring to the drawings and particularly to the type of front wheel suspension means for which the device of the present invention is especially intended, the vehicle structure illustrated includes side frame members A, A interconnected in the region of the front wheels B, B by a cross member C which extends beneath the side frame members and projects outwardly beyond them at D, D as bracket means on which the wheel suspension means for the front wheels of the vehicle is mounted. Since except for FIG. 1, the wheel suspension means at one side only of the vehicle is shown and since, so far as the present invention is concerned, the suspension means at the other side of the vehicle is a mirror image of the suspension means at said one side, a description of the side illustrated will apply equally to the other side.

The illustrated wheel suspension means includes a housing member E enclosing portions of the wheel suspension means not pertinent to the present invention, said housing being fixed to the outwardly projecting bracket portion D of the cross member C and which housing, in addition to other structural features and functions, is provided at the upper side thereof with a pair of bosses F, F disposed in side-by-side relation in a line extending longitudinally of the vehicle and having generally flat top surfaces disposed in a common horizontal plane and each of said top surfaces being provided with a slot G formed therein extending transversely of the length of the vehicle. Mounted on the bosses F, F is the shaft element H having the ends thereof projecting beyond the opposite sides of the housing E and affording pivotal mounting of the ends of the upper suspension arm I. Bolts J, J extend through holes in the shaft element H and the respective slots G, G and engage nut means K, K on the under side of the respective bosses, said nut means being free to move longitudinally of the slots while being held against rotation. By loosening these bolts and moving the shaft element along one or both of the slots G, G, the desired position of the outer end of the upper wheel suspension arm relative to the lower arm can be achieved to effect desired caster and camber adjustments of the angle of the axis of pivotal movement of the steering knuckle on which the front wheel is mounted. The upper surface of the housing E adjacent the face thereof which is adjacent to the wheel is provided with an opening L affording clearance for the upper end of a shock absorber M which is attached to brackets N, N by a bolt O.

Moving the rearward end of the shaft element H relative to the forward end thereof tends to swing the upper end of the steering knuckle forwardly of a vertical plane extending transversely of the vehicle and intersecting the axis of movement of the lower end of the steering knuckle to produce a negative caster adjustment. Similarly, moving the forward end of the shaft element H outwardly relative to the rearward end thereof effects a positive caster adjustment. Moving the shaft element H bodily outward to an extent causing the axis of movement of the steering knuckle to extend downwardly and inwardly toward the vehicle results in a positive camber adjustment and the reverse adjustment of the shaft element H produces a negative camber adjustment.

Heretofore, the only known method of effecting these adjustments was that of loosening the bolts G, G and attempting to shift the shaft element H in the desired direction and at the desired end thereof by the use of a pry bar inserted past the mechanism contained under the hood. The present invention is concerned with a jack screw device having a central portion detachably engagable with a portion of the housing member E and having a pair of arm portions adapted to engage opposite ends of the upper arm supporting shaft H and further having jack screw means reacting against the outer side face of the housing member E to effect positive adjustment of the shaft element H on the housing without the uncertain results obtainable by the old pry bar method.

The illustrated embodiment of the invention comprises a jack screw means including an elongated metal bar forming a base member 1. This base member includes a straight, midlength section 2 adapted, in the position of use, to be disposed above and outwardly from the hole L in the housing E. At the outer ends of this midlength portion, the bar thence extends in inwardly diverging runs 3, 3 to points equally outwardly disposed from the front faces P, P of the bosses F, F and from which runs, the bar thence extends in runs 4, 4 parallel to the faces P, P and also parallel to the midlength portion 2, said runs terminating in inwardly extending arm portions 5, 5 adapted to extend beneath the ends of the shaft element H adjacent to the connection of the ends thereof to the upper arm I and said arm portions are formed as upwardly and outwardly extending hooks 6, 6 which engage the opposite ends of the shaft element H.

At the center of the midlength portion 2 thereof, the base member carries a resiliently mounted hook member 7 formed of a metal strip and which in side elevation (see FIGS. 3 and 4) is of modified Z-shape including an upper run 8 which overlies the top face of the base member and which is provided with an elongated slot 9 through which the threaded shank of a bolt 10 extends into threaded engagement with the threaded hole 11 in the base member. A compression spring 12 surrounds the bolt 10 and extends between the underside of the head of the bolt 10 and a washer 13 lying on the adjacent face of the upper run 8 of the hook member 7 and operates to hold the run 8 thereof in yielding engagement with the base member surface while allowing some rocking movement of the hook element 7 as will presently be explained. The hook element 7 extends from the run 8 downwardly past the side of the base member 1 remote from the housing E in a sweeping curve 14 and thence tangentially downwardly and toward the housing E in a run 15 and terminates in a return bend portion 16 having the throat thereof facing away from the housing E, said return bend throat forming a hook portion engagable with the hole L as best shown in FIG. 2.

The runs 4, 4 of the base member 1 are mirror images of each other and include a boss 17 at the side thereof facing the housing E and the threaded bore 18 extending therethrough from the outer face and through the boss 17. A jack screw 19 threadedly extends through the bore 18 and has the end thereof adapted to engage the side face P of the adjacent boss F of the housing E.

In use, the device is brought into contact with the portions of the shaft H to be engaged by the hook 6 with the base member extending substantially vertical so as to permit the insertion of the ends of the hooks 6, 6 beneath the shaft H. The base member is then swung downwardly in a clockwise direction as viewed in FIG. 3 into a substantially horizontal position and the center hook element 7 is moved against the bias of the spring 12 to enter the opening L and by engagement with the edge of said opening (see FIG. 3) to releasably hold the base member in a position in which the jack screws 19, 19 are at substantially a right angle to the faces P, P of the bosses F, F. The jack screws 19, 19 are then advanced into such contact with these faces as will cause the hooks 6, 6 to engage the shaft. When the bolts J, J loosened, the shaft will be held in whatever position it occupied when the device was applied thereto. The loosening of the bolts J, J causes the weight of the car on the wheel mounting means to apply the force thereof against the device, wherefore adjustment of the screws 19, 19 will effect such relative shifting of one end or the other or of both ends of the shaft H as will give the wheel associated therewith the desired amount of camber and caster. When the adjustment is completed, the bolts J, J are tightened and the device removed and the same procedure followed on the other front wheel, it being noted that the balanced design of the device permits it to be used on either the right or the left hand wheel suspension means.

Referring to FIG. 3, it will be noted that the point of application of a force exerted by the jack screws 19, 19 is below the point of engagement of the hooks 6, 6 with the opposite ends of the shaft 8, thereby tending to cause the base member 1 to try to swing about the axis of the shaft H in a counterclockwise direction as viewed in FIG. 3. The engagement of the underside of the housing by the hook portion 16 of the latch member 7 resists this tendency and maintains the base member anchored in the said position holding the axial line of the jack screws 19, 19 in substantial right angle attitude with respect to the plane of the surfaces P, P.

A great advantage of the present device as distinguished from the older pry bar method previously referred to is that under these conditions, the wheel suspension means is always under control in contrast with the said older method in which the loosening of the bolts J, J completely destroyed any existing adjustment of the wheel suspension means requiring a complete new adjustment to be made. Moreover, the present device permits one man to do the entire operation whereas, under the previous mode of effecting adjustment, at least two men were required and usually three, one to operate the pry bar, another to check the adjustment against the measuring instruments therefor and a third man to tighten the bolts J, J when the desired point of adjustment had been reached and confirmed by the other two men.

While in the foregoing specification there has been disclosed a presently preferred embodiment of the invention, it is not to be deemed therefrom that the invention is limited to the precise details of construction thus disclosed by way of example and it will be understood that the invention includes as well all such changes and modifications in the parts and in the construction, combination and arrangement of parts as shall come within the purview of the appended claims.

I claim:

1. A tool for establishing desired camber and caster angles of the mounting means for the independently sprung front wheels of a motor vehicle and in which the mounting means for each front wheel includes a pivotally mounted upper arm and a shaft member on which said upper arm is pivotally mounted at axially spaced points together with means for securing said shaft member on a supporting means in selected positions of adjustment in a horizontal plane to effect said camber and caster adjustment; said tool comprising a base member having a pair of laterally spaced, integrally formed end portions detachably engageable with and disengageable from the shaft member adjacent the points thereon on which the upper arm of the wheel mounting means is pivotally mounted, a pair of jack screws threadedly engaging said base member and disposed one each adjacent to each of said shaft member engaging portions and positioned with the axes thereof contained in a plane laterally offset from a plane parallel to said first plane and containing the line of axial movement of the upper arm on the shaft member, and a hook element carried by said base member and releasably engageable with the supporting means of the wheel mounting means relative to which said shaft member is adjustably secured, said hook member being operative to resist tendency of rotational movement of said base member incident to stress on said base member deriving from the operative engagement of said base member with the shaft member of said wheel mounting means and said jack screws with the supporting means of the wheel mounting means.

2. A tool for establishing dseired caster and camber angles of a motor vehicle front wheel mounting means as claimed in claim 1 in which said portions of said base member which are detachably engageable and disengageable with the shaft member of the wheel mounting means comprise integrally formed hook elements on the ends of said base member.

3. A tool for establishing desired camber and caster adjustment as claimed in claim 1 including means for mounting said hook element on said base member with capacity for movement toward and away from the portion of the supporting means for said wheel mounting means and in which said mounting means for said hook member includes spring means tending to urge said hook member to move on said base member in a direction to maintain engagement thereof with the supporting means for said shaft element.

References Cited by the Examiner

UNITED STATES PATENTS 3,199,837   8/1965   Vestal et al. _____ 254—1

WILLIAM FELDMAN, *Primary Examiner.*

OTHELL M. SIMPSON, *Examiner.*